US009678762B2

(12) United States Patent
Rosset et al.

(10) Patent No.: US 9,678,762 B2
(45) Date of Patent: Jun. 13, 2017

(54) DYNAMIC, AUTOMATED MONITORING AND CONTROLLING OF BOOT OPERATIONS IN COMPUTERS

(71) Applicant: Cisco Technology, Inc., San Jose, CA (US)

(72) Inventors: Sebastien Rosset, Sunnyvale, CA (US); Vipin Dravid, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 14/601,566

(22) Filed: Jan. 21, 2015

(65) Prior Publication Data

US 2016/0210161 A1 Jul. 21, 2016

(51) Int. Cl.

*G06F 9/00* (2006.01)
*G06F 15/177* (2006.01)
*G06F 9/44* (2006.01)
*G06F 11/30* (2006.01)
*G06F 11/14* (2006.01)

(52) U.S. Cl.

CPC .......... *G06F 9/4416* (2013.01); *G06F 9/4408* (2013.01); *G06F 11/1417* (2013.01); *G06F 11/302* (2013.01); *G06F 11/3006* (2013.01); *G06F 11/3034* (2013.01); *G06F 11/3055* (2013.01)

(58) Field of Classification Search

CPC .......................................................... G06F 9/44
See application file for complete search history.

(56) References Cited

U.S. PATENT DOCUMENTS 6,748,525 B1 6/2004 Hubacher et al.
6,857,069 B1 2/2005 Rissmeyer et al.
6,931,519 B1 * 8/2005 Keller ................ G06F 11/1417 713/1
7,073,053 B1 7/2006 Oz et al.
7,127,602 B1 10/2006 Bakke et al.
7,360,072 B1 4/2008 Soltis et al.

(Continued)

OTHER PUBLICATIONS

International Search Report and Written Opinion in corresponding International Application No. PCT/US2016/013849, mailed May 23, 2016, 14 pages.

*Primary Examiner* — Mohammed Rehman
(74) *Attorney, Agent, or Firm* — Edell, Shapiro & Finnan, LLC

(57) ABSTRACT

A network device manages multiple computers and connects the computers to boot devices that store boot programs used by the computers to boot. The network device downloads to each computer a respective boot order that specifies an order in which the computer is to attempt to boot from boot devices specified in the boot order. The network device automatically determines network paths over which each computer is to access the boot devices in the boot order for that computer. The network device automatically determines an availability of each network path and an availability of each boot device. The network device also receives boot status from each computer while the computer attempts to boot from boot devices in the boot order for that computer. The network device automatically performs boot-related actions based on the determined network path and boot device availabilities, and the received boot status.

20 Claims, 14 Drawing Sheets

(56) References Cited

U.S. PATENT DOCUMENTS

| | | | | |
|---|---|---|---|---|
| 7,363,356 | B1 | 4/2008 | Rissmeyer et al. | |
| 7,386,711 | B1 | 6/2008 | Haimovsky et al. | |
| 2002/0161868 | A1 * | 10/2002 | Paul | G06F 9/4416 709/221 |
| 2004/0078679 | A1 | 4/2004 | Cagle et al. | |
| 2007/0268917 | A1 * | 11/2007 | Wong | G06F 9/4416 370/401 |
| 2008/0183812 | A1 * | 7/2008 | Paul | G06F 9/4416 709/203 |
| 2010/0125770 | A1 * | 5/2010 | Keith, Jr. | H04L 67/34 714/752 |
| 2014/0047010 | A1 * | 2/2014 | Eggers, Jr. | H04L 29/06 709/203 |
| 2014/0164752 | A1 | 6/2014 | Venkiteswaran et al. | |
| 2015/0026448 | A1 * | 1/2015 | Jiang | G06F 9/4416 713/2 |

* cited by examiner

BOOT POLICY 1000

1010 1005

| BOOT ORDER | BOOT DEVICE |
|---|---|
| 1 | STORAGE A, LUN A |
| 2 | STORAGE A, LUN B |
| 3 | STORAGE B, LUN C |
| 4 | STORAGE B, LUN D |
| ⋮ | ⋮ |

FIG.10

DYNAMIC, AUTOMATED MONITORING AND CONTROLLING OF BOOT OPERATIONS IN COMPUTERS

TECHNICAL FIELD

The present disclosure relates generally to automated monitoring and controlling of boot operations in computers.

BACKGROUND

Computers connected to a network device, such as a network switch, may boot-up from time-to-time when the computers are either powered-on or reconfigured. Typically, each computer attempts to boot sequentially from various storage devices, such as disks, in a boot order prescribed by a boot policy for that computer. There are many reasons a given computer may fail to boot properly from a given storage device in the boot order. For example, the storage device, or a communication link between the storage device and the computer, may have failed. Alternatively, the storage device may be powered-off, or be otherwise unavailable. Additionally, the computer may have failed to exit its power-on-self-test (POST) prior to entering the boot process. Discerning the cause of such a failed boot is difficult. Current techniques to discern failure points and implement corrective actions employ labor intensive manual data collection and intervention. This is inefficient and time consuming, especially where large numbers of computers are involved.

BRIEF DESCRIPTION OF THE DRAWINGS

FIG. 10 is an illustration of an example boot profile for a computer, according to an example embodiment.

DESCRIPTION OF EXAMPLE EMBODIMENTS

Overview

In an embodiment, a network device manages multiple computers and connects the computers to boot devices that store boot programs used by the computers. The network device downloads to each computer a respective boot order or sequence that specifies an order in which the computer is to attempt to boot from boot devices specified in the boot order. The network device automatically determines network paths over which each computer is to access the boot devices in the boot order for that computer. The network device automatically determines an availability of each network path and an availability of each boot device. The network device also receives boot status from each computer while the computer attempts to boot from boot devices in the boot order for that computer. The network device automatically performs boot-related actions based on the determined network path and boot device availabilities, and the received boot status.

Example Embodiments

A converged infrastructure (CI) is a modular, integrated, often pre-configured or at least easily configured, set of information technology (IT) components, typically including storage, network, compute, and virtualization components, that may be shared across multiple user applications that require storage, network, and compute resources. Due to the modular nature of the CI, the CI components made available to the user applications may be scaled up and down relatively easily and efficiently in order to accommodate corresponding increases and decreases in user application resource requirements.

Figure 1:
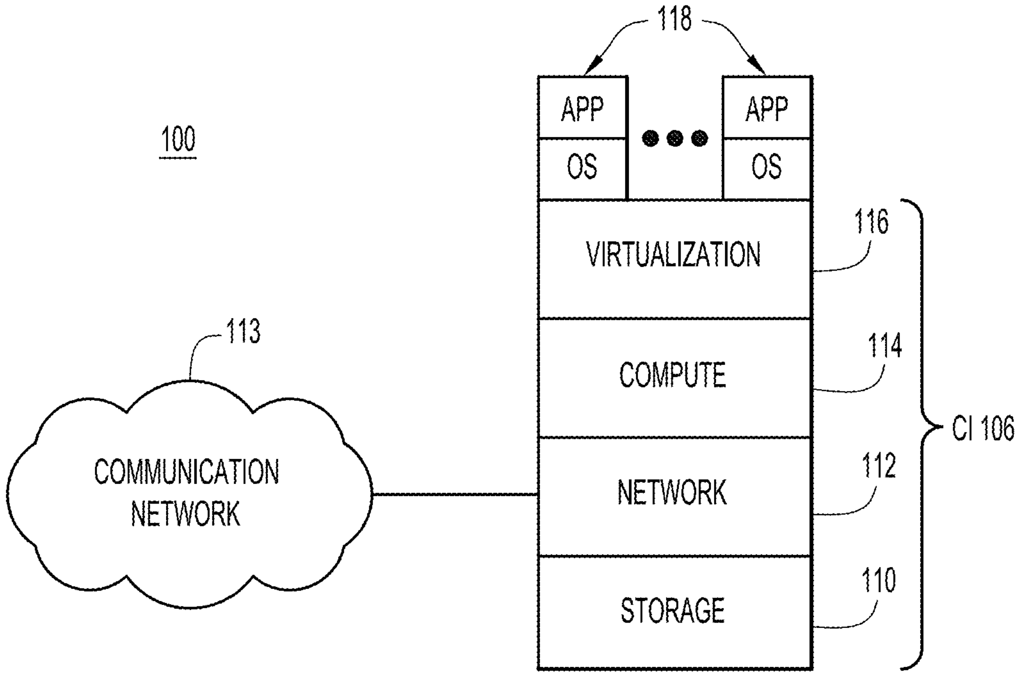
FIG. 1 is a block diagram of an example, generalized converged infrastructure (CI) in which embodiments presented herein may be implemented, according to an example embodiment.

Referring first to FIG. 1, a block diagram of an example, generalized CI 100 is shown in which embodiments presented herein may be implemented. CI 106 includes an integrated set of components, including a storage component 110 to provide data storage, a network component 112 to provide connectivity to external devices and communication networks 113 (including wide area network (WANs), such as the Internet, and local area network (LANs), including virtual networks), a compute or server component 114 to provide processing capacity to the CI, and a virtualization component 116, such as a hypervisor, to host virtual environments. Virtualization component 116 may host multiple virtual user operating environments 118 on the stack of CI components 110, 112, and 114. Virtual user operating environments 118 may each include a virtualized operating system (OS), and one or more applications (APs) executing in the virtualized OS. Components 110, 112, and 114 provide respective data storage, network, and compute resources required by each OS and the respective one or more APs.

Figure 2:
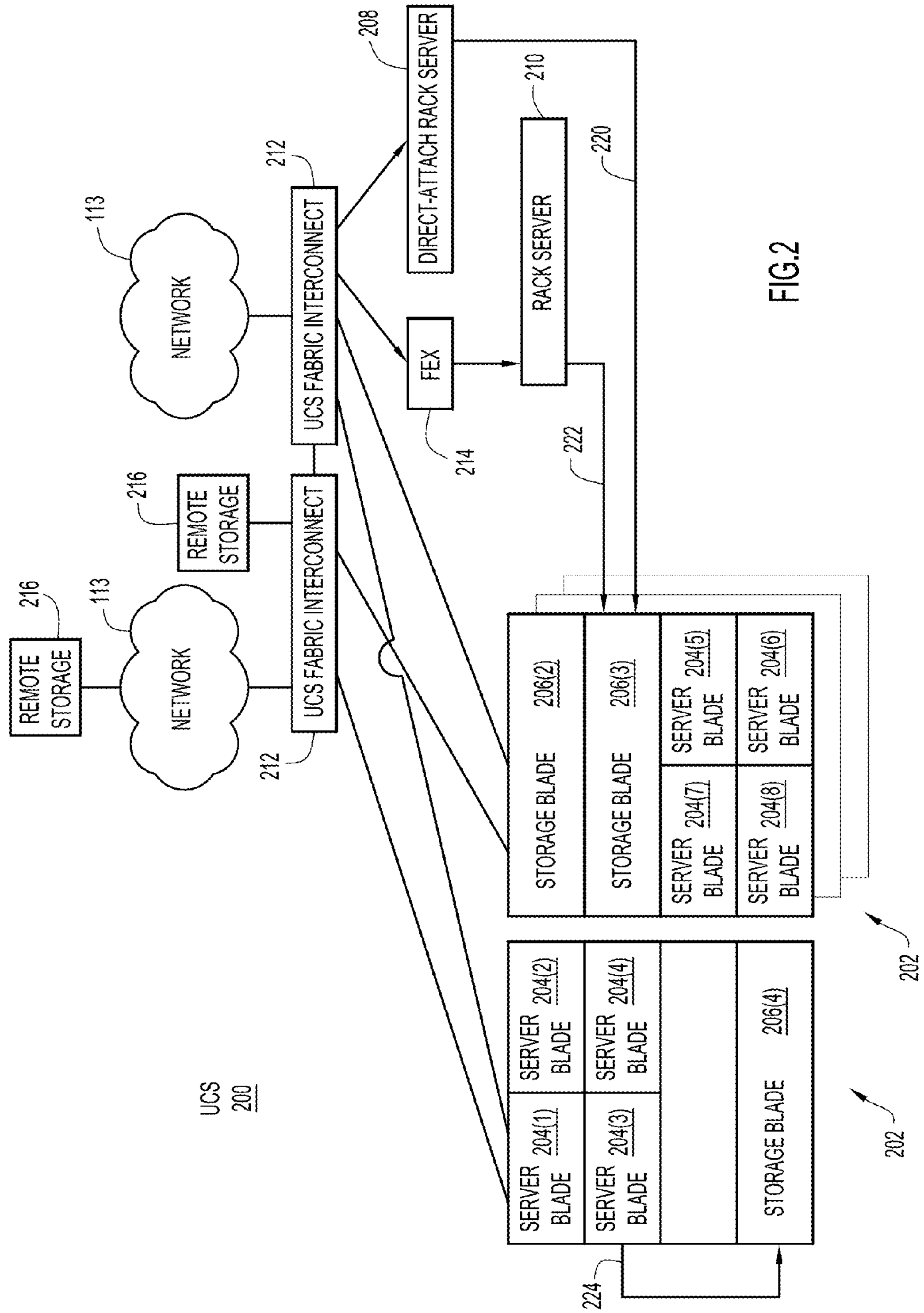
FIG. 2 is a block diagram of an example CI referred to as a Uniform Computing System (UCS), in which embodiments presented herein may be implemented, according to an example embodiment.

With reference to FIG. 2, there is a block diagram of an example CI referred to as a Uniform Computing System (UCS) 200 provided by Cisco Technology, Inc., in which embodiments presented herein may be implemented. UCS 200 includes multiple powered chassis 202 having slots for multiple server blades 204 to provide compute resources and multiple storage blades 206 to provide storage resources for the server blades. Rack mounted servers 208 and 210 provide further compute resources. Because server blades 204 and rack mounted servers 208 and 210 provide compute resources, the server blades and rack mount servers are referred to more generally as "computers" in the ensuing description. UCS 200 also includes a fabric interconnect 212 to provide network resources. Fabric interconnect 212 connects directly or indirectly with computers 204, 208, and 210, storage blades 206, remote storage 216, and network 113 over respective logical and physical connections, including direct cabling between input/output (I/O) ports of the connected components, and a fabric extender (FEX) 214, as depicted in FIG. 2. Fabric interconnect 212 selectively interconnects the above mentioned components, e.g., selected ones of computers 204, 208, and 210 with selected ones of storage blades 206 and remote storage 216 and 218, under control of a fabric interconnect controller (shown in FIG. 4). Connections established between computers 204, 208, and 210 and storage blades 206 and remote storage 216 are referred to as network paths or communication links. Fabric interconnect 212 operates, generally, as a network device, such as a network switch, that interconnects various components. Fabric interconnect 212 is thus referred to more generally as a "network device" 212.

Storage blades 206 and external storage 216 are individually and collectively referred to more generally as "storage" in the ensuing description. Storage 206 and 216 may each be logically and/or physically subdivided into many storage spaces, referred to as storage devices (not specifically shown in FIG. 2). In other words, storage 206 and 216 each host many individually addressable/accessible storage devices. The storage devices are mapped to computers 204, 208, and 210 so that each storage device may be shared among one or more of computers 204, 208, and 210 mapped to that storage device. Computers 204, 208, and 210 access their respectively mapped storage devices over network paths established between the computers and the storage devices through fabric interconnect 212. The storage devices may each store only data used and generated by a mapped computer, only an initial program load (IPL) from which the mapped storage device boots, or both. A storage device that stores such an IPL is referred to as a boot device. During boot-up, computers 204, 208, and 210 retrieve the IPLs stored in the mapped boot devices and boot using the retrieved IPLs. For example, at 220 and 222, computers 208 and 210 retrieve their IPLs from boot devices hosted on storage 206(3), respectively. At 224, computer 204(3) retrieves its IPL from a boot device hosted on storage 206(1).

Figure 3:
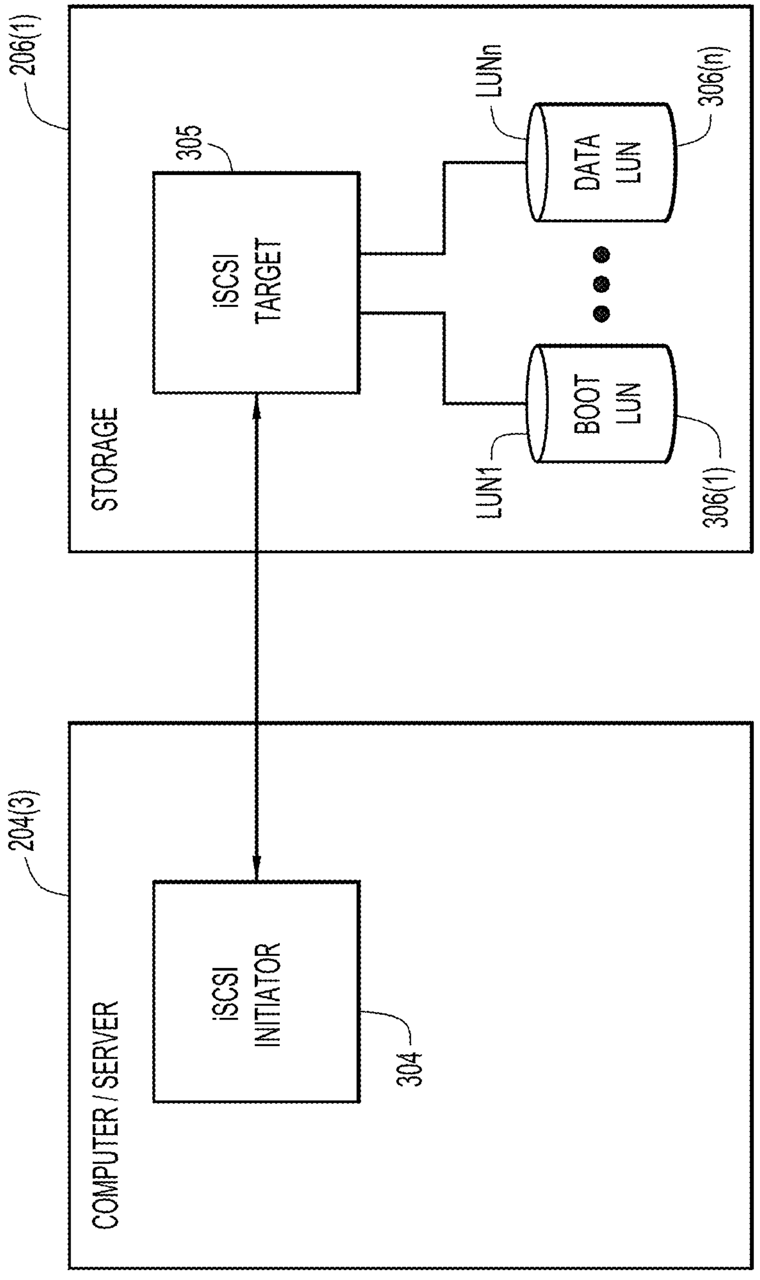
FIG. 3 is an example in which a computer accesses a storage device in a storage blade over an Internet Small Computer System Interface (iSCSI), according to an example embodiment.

With reference to FIG. 3, there is depicted an example in which computer 204(3) accesses storage devices in storage 206(1) over an Internet Small Computer System Interface (iSCSI), including an iSCSI initiator 304 of computer 204(3) and an iSCSI target 305 of storage 206(1). Storage 206(1) hosts storage devices 306(1)-**306(*n*) identified by respective Logical Unit Numbers (LUNs) LUN1-LUNn. Storage devices 306 are also referred to as simply "LUNs" 306. LUNs 306 that store IPLs or data only are referred to as "boot LUNs" or "data LUNs, respectively. To access a given one of LUNs 301, iSCSI initiator 304 sends an access request to iSCSI target 305** identifying the given LUN, and the iSCSI target provides the requested access based on the provided LUN.

With reference to FIGS. 2 and 3, fabric interconnect 212 monitors and dynamically controls the manner in which computers 204, 208, and 210 boot from storage devices, such as boot devices or LUNs (e.g., LUNs 306) hosted on storage 206 and 216. To do this, fabric interconnect 212 automatically determines availabilities of boot LUNs from which computers 204, 208, and 210 are directed to boot by their respective boot policies and controls a boot order in which the computers accesses the boot LUNs in the boot policies based on the determined availabilities. If certain boot LUNs are determined to be unavailable, fabric interconnect 212 automatically takes corrective actions to compensate. For example, fabric interconnect 212 may permute the boot order as necessary to avoid unavailable LUNs and takes other corrective actions to save power that would otherwise be consumed by computers 204, 208, and 210 and storage 206 and 216. As part of the monitor and dynamic control actions, fabric interconnect 212 also performs boot failure analysis and reporting. The qualifier "automatically" means that the qualified action is performed/achieved by a computer executing logic without manual intervention.

Figure 4:
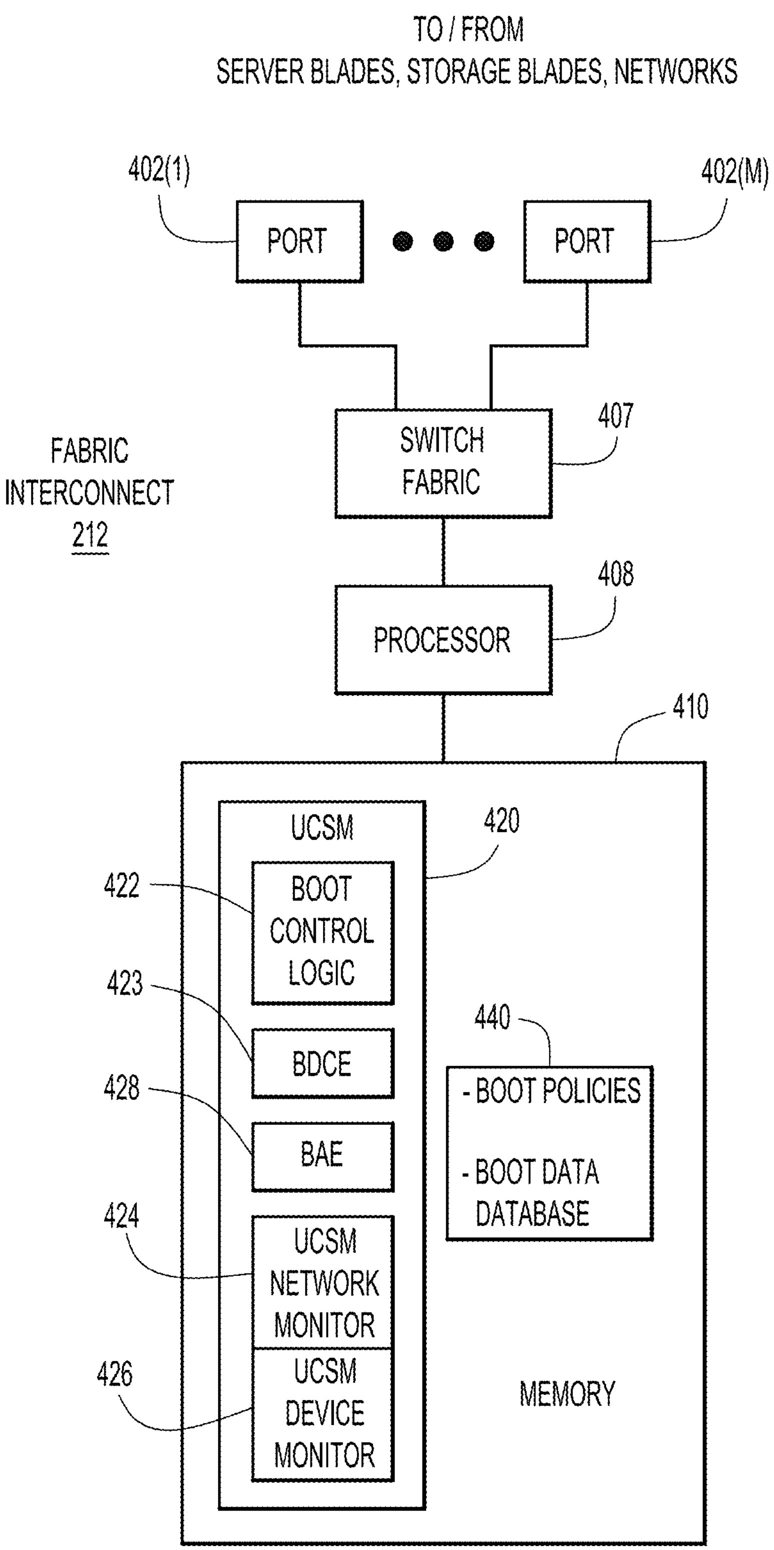
FIG. 4 is a block diagram of an example fabric interconnect from FIG. 2 configured to perform boot monitor and control operations presented herein, according to an example embodiment.

With reference to FIG. 4, there is depicted an example block diagram of fabric interconnect 212 configured to perform boot monitor and control operations presented herein. Fabric interconnect 212 includes a plurality of network ports 402(1)-402(M) to receive data packets from and send packets to the network 113, computers 204, 208, and 210, and storage 206 and 216, a switch fabric 407 to switch packets among the ports, a central processing unit (CPU) 408 (also referred to simply as a "processor" 408), and a memory 410. The processor 408 is, for example, a microprocessor or microcontroller that executes software instructions stored in the memory 410 to perform higher level control of the operations of fabric interconnect 212.

Memory 410 may comprise volatile memory (VM) and non-volatile memory (NVM) in various forms, including read only memory (ROM), random access memory (RAM), magnetic disk storage media devices, optical storage media devices, flash memory devices, electrical, optical, or other physical/tangible memory storage devices. Thus, in general, the memory 410 may comprise one or more tangible (non-transitory) computer readable storage media (e.g., a memory device) encoded with software comprising computer executable instructions and when the software is executed (by the processor 408) it is operable to perform the techniques described herein. In an embodiment, processor 408 includes an x86 series processor by Intel. However, other types of processors are possible.

For example, memory 410 stores or is encoded with instructions for a UCS Manager (UCSM) 420 to configure switch fabric 407 to interconnect various ones of ports 402, and provision and configure components connected to the ports. UCSM 420 includes Boot Control logic 422 to perform boot monitor and control actions presented herein. As such, Boot Control logic 422 includes a Boot Data Collection Engine (BDCE) 423 to collect information (e.g., boot status and other boot-related information from components connected with fabric interconnect 212), a UCSM Network Monitor 424 to monitor/determine availabilities of network paths connected through fabric interconnect 212, a UCSM Device Monitor 426 to monitor/determine availabilities of endpoint devices connected over the network paths (e.g., computers 204, 208, and 210, and storage 206 and 216, including the LUNs hosted therein), and a Boot Analysis Engine (BAE) 428 to perform boot failure analysis and corrective actions based on the monitored availabilities and collected boot-related information.

Operations that UCSM 420 performs include, but are not limited to, the following:

a. Performing automatic discovery of computers 204, 208, and 210 and their respective components connected to fabric interconnect 212, maintaining an inventory of computers 204, 208, and 210, and monitoring the health/availability of the computers. These processes occur without requiring a user to enter computer credentials;

b. Providing computer, storage, and network path inventory reports to users;

c. Provisioning logical computers, such as virtual machines (VMs), on computers 204, 208, and 210. The VMs are logically configured and can be deployed on any physical computer that supports the logical configuration requirements. Logical computers can be defined even if no physical computer exists;

d. Deploying logical computers over physical computers, which cause the physical computer to be configured as specified in the logical computer;

e. Configuring computers 204, 208, and 210 and any VMs hosted thereon with a boot policy that specifies a boot sequence or order in which the computers are to attempt to boot from different storage. For example, computers may be configured to boot from local devices (local disk, USB, flash memory, and the like) or remote devices over interfaces/interface protocols such as, but not limited to, Fibre Channel (FC), FC over Ethernet (FCoE), iSCSI, the Preboot Execution Environment (PXE), and the like; and f. Downloading the boot policy to the computers.

Memory 410 stores data 440 used and generated by the processor 408 when executing UCSM 420. Data 440 includes boot policies that specify the boot devices (and the storage that hosts the boot devices) from which computers 204, 208, and 210 are to boot and the order in which the computers are to attempt to boot from those boot devices. Data 440 also includes a boot data database that stores boot related information collected by BDCE 423.

Figure 5:
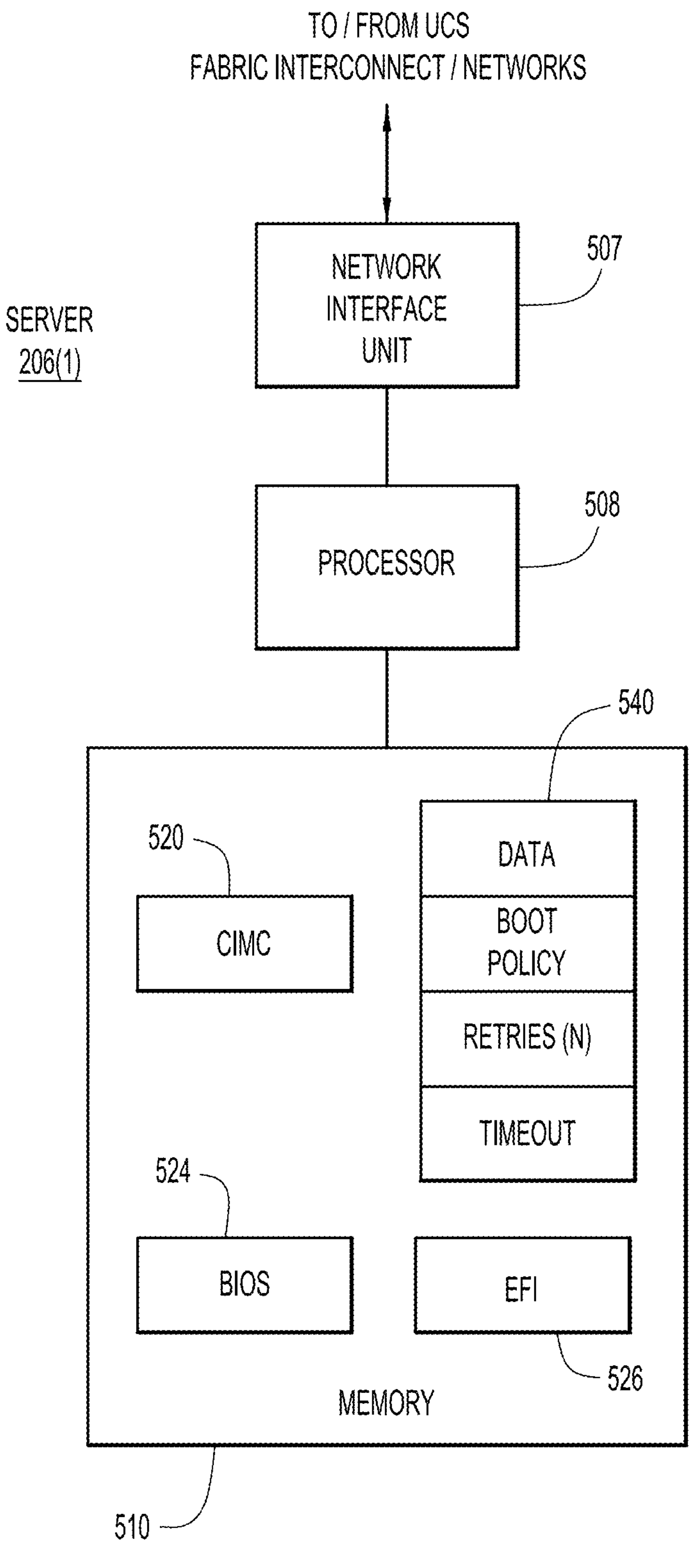
FIG. 5 is a block diagram of a computer/server from FIG. 2, according to an example embodiment.

With reference to FIG. 5, there is depicted an example block diagram of computer 204(1). The block diagram is representative of the other computers depicted in FIG. 2. Computer 204(1) includes a network interface unit 507 to connect with external devices, a central processing unit (CPU) 508 (also referred to simply as a "processor" 508), and a memory 510. The processor 508 is, for example, a microprocessor or microcontroller that executes software instructions stored in the memory 510 to perform higher level control of the operations of computer 204(1).

Memory 510 comprises memory components similar to those listed above for memory 410 and, in general, comprises one or more tangible (non-transitory) computer readable storage media (e.g., a memory device) encoded with software comprising computer executable instructions and when the software is executed (by the processor 508) it is operable to perform the techniques described herein.

For example, memory 510 stores or is encoded with instructions for: an Integrated Management Controller (IMC) 520, such as a Cisco IMC (CIMC), to configure and manage computer 204(1) and to communicate with external devices through network interface unit 507; BIOS 524 accessed by processor 508 during the boot of computer 204(1), where the BIOS may communicate with the CIMC over a keyboard controller style (KCS) interface, a block transfer (BT) interface associated with an Intelligent Platform Management Interface (IPMI), or a network interface; and an Extensible Firmware Interface (EFI) 526, which provides services that may be invoked during and after a boot process and in support of executing the BIOS. In addition, memory 510 stores data 540 used and generated by the processor 508 and BIOS 524. Data 540 includes, but is not limited to a boot policy downloaded to computer 204(1) by fabric interconnect 212, a predetermined timeout period, and a number N of retries.

A boot process in computer 204(1) is now described briefly. Each time computer 204(1) boots, e.g., after power-on or reconfiguration, BIOS 526 accesses the boot policy stored in non-volatile memory (in data 540) and applies the boot policy. BIOS 526 attempts to boot from a first boot device (e.g., LUN(1)) listed in the boot order of the boot policy. If the boot fails, BIOS 526 attempts to boot from a second boot device (e.g., LUN2) listed in the boot order, and so on down the boot order until either an attempt to boot is successful or the boot order is exhausted.

The timeout period and number N of retries in data 540 may be used during the above-described boot process in the following manner. Each time BIOS 526 starts an attempt to boot from a boot device, the BIOS starts a timer. In one embodiment, if the timer reaches the predetermined timeout period before the boot has completed, the boot is deemed to have failed. Thus, BIOS 526 starts an attempt to boot from a next device in the boot order, and resets the timer, and the process repeats down the boot order. In another embodiment, instead of moving to the next boot device in the boot order after the boot is deemed to have failed, BIOS 526 will attempt to boot from the same device repeatedly, N times, and then move to the next boot device in the boot order. Moreover, a new, increased timeout period may be used in the repeated attempts to boot from the boot device.

There are many reasons that an attempt to boot from a given boot device may fail, including, but not limited to the following:

a. Storage (and thus the boot device hosted thereon) may be permanently or temporarily unavailable;

b. One or more network/connection paths to the storage may be permanently or temporarily unavailable. In some cases, network/connection paths may fail or be unreliable while the computer is trying to boot;

c. The computer may have failed to complete power-on-self-test (POST). For example, POST may fail due to hardware failures and/or misconfigurations;

d. Boot-related network accesses may fail due to network congestion;

e. Boot timeout or retry values may be set too aggressively (i.e., too low), which may cause a bootstrap loader to fail to connect to a required peripheral device, such as the boot device;

f. Computer errors such as Peripheral Component Interface (PCI) link training issues may cause BIOS 524 to be unable to locate the peripheral devices used for boot;

g. The boot device (or components thereof, such as a Host Bus Adapter (HBA), iSCSI, Ethernet interface, and the like) may have hardware or software failures, or may be misconfigured (such as the HBA being configured with an incorrect target World Wide Name (WWN) or LUN);

h. The computer is configured to prevent boot unless some pre-condition is satisfied. For example, the computer may have a battery which is critical for correct execution of the operating system and/or applications. If the battery is below some threshold, the computer will not boot;

i. The Master Boot Record (MBR) may not have been written to the boot device; and j. BIOS 524 successfully loads the boot loader from the boot device, but the boot loader is unable to load the operating system.

According to embodiments presented herein, BIOS 524 and CIMC 520 include the following capabilities to provide insight into the reasons a boot may have failed in computer 204(1) and enable fabric interconnect 212 to assert control over the boot process in the computer. BIOS 524 sends a notification to CIMC 520 through the KCS or BT interface each time the BIOS starts an attempt to boot from a boot device. The notification includes an identifier of the boot device from which BIOS 524 is attempting to boot. CIMC 520 sends the notification to fabric interconnect 212. Fault Resiliency Booting (FRB) is configured and enabled in BIOS 524 and CIMC 520. Thus, if BIOS 524 fails to reach POST completion, CIMC 520 generates an alarm/indicator and sends the alarm/indicator to fabric interconnect 212. BIOS 524 provides access to run-time attributes that indicate the availability of a given boot devices. The attributes can be used to prevent or continuously retry boot until the given boot device becomes available. For each boot device, the attribute can be set to "available" or "unavailable". "Unavailable" means the boot device is not available, hence if attempted, boot will fail. "Available" means the boot device is known to be available from the perspective of the fabric interconnect 212. Hence, boot should succeed; however network conditions such as congestion may prevent the actual boot. The attributes may be set responsive to a message from fabric interconnect 212 that is received through CIMC 520.

As mentioned above, during boot, BIOS 524 attempts each boot device as indicated in the boot order. When all of the prescribed boot devices have failed, computer 204(1) executes EFI 526 (referred to as the "EFI shell") and an EFI start-up script "startup.nsh" is executed from non-volatile memory independent of the boot device. CIMC 520 provides a mechanism to install/update the startup.nsh script when the computer enters the EFI shell. The EFI shell automatically performs the following tasks that lead to further insight as to why boot may have failed:

a. Collecting an EFI mapping between user-defined boot device names and device handles. The mapping may be used to identify which boot devices are visible to the EFI shell;

b. Collecting a list of devices managed by EFI drivers;

c. Collecting the available drivers;

d. Collecting driver diagnostics;

e. Collecting the content of the blocks that are supposed to contain the MBR for all block devices;

f. Collecting values of PCI registers for all devices. This includes the PCI command register, the PCI status registers and Advance Error Reporting (AER) registers. These values may be used to determine if there are problems with PCI devices, such as device raising SERR, parity errors, master abort, link training errors, flow control errors, Data Link Protocol errors, and the like; and g. Collecting boot-related BIOS error codes, including codes that indicate that:

i. The BIOS is unable to reach an iSCSI target (e.g., no L3 connectivity or the connection is refused);

ii. An iSCSI session started, but was terminated, e.g., due to invalid credentials; or iii. An iSCSI session was initiated, but there is no bootable LUN (i.e., no LUN from which the computer can boot).

EFI shell 526 sends the collected information to CIMC 524, which forwards the information to fabric interconnect 212.

Figure 6:
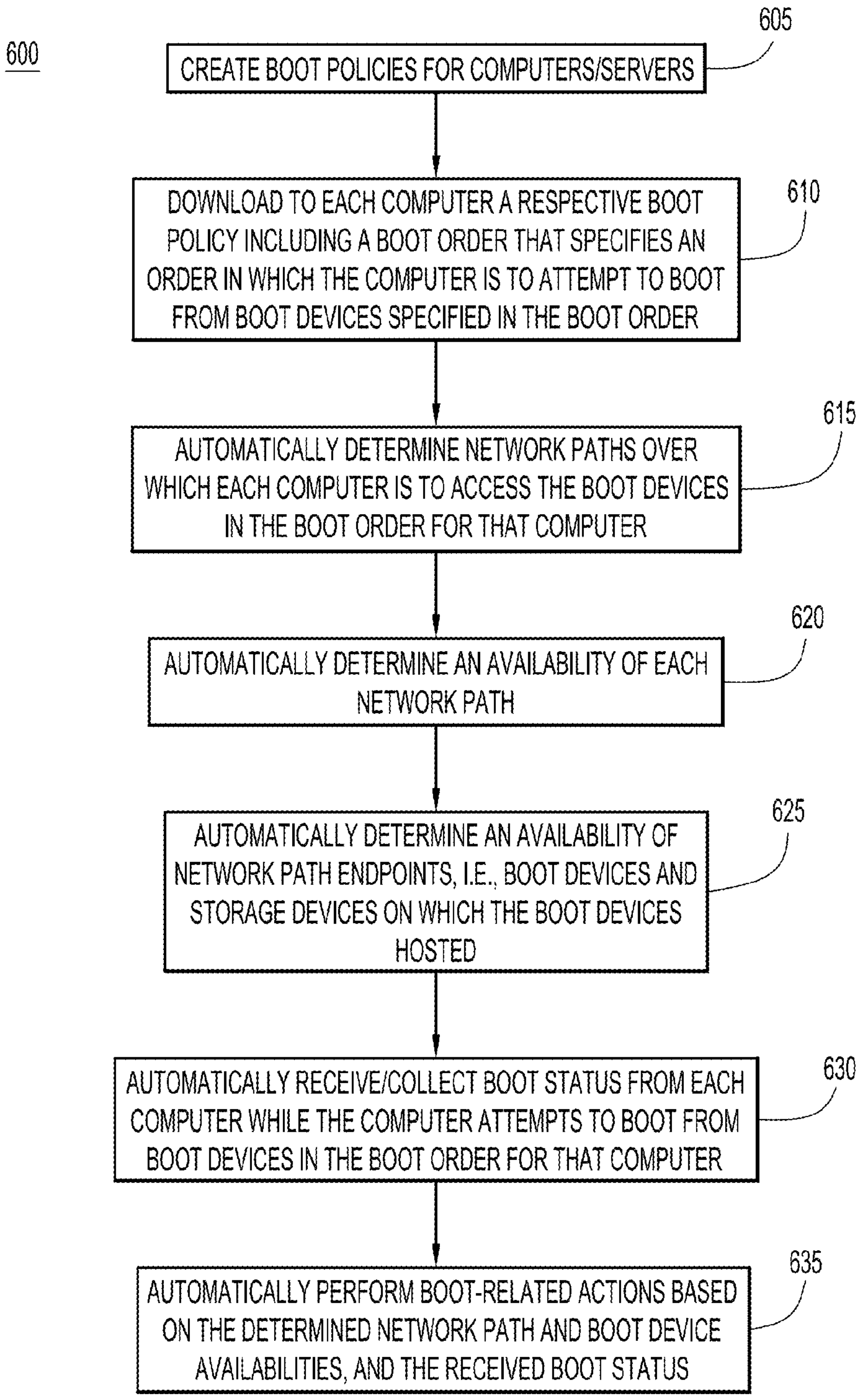
FIG. 6 is a flowchart of an example high-level method of monitoring and controlling boot processes in computers/servers that is performed by the fabric interconnect, according to an example embodiment.

Turning now to FIG. 6, there is shown a flowchart of an example high-level method 600 of monitoring and controlling boot processes in computers 204, 208, and 210 (referred to as "the computers" in the description of method 600) that is performed by fabric interconnect 212. Fabric interconnect 212 executes logic 420 to perform method 600. Reference is also made to FIG. 2 for purposes of the description of FIG. 6.

Initially, at 605, fabric interconnect 212 creates and stores boot policies for the computers. Each boot policy specifies an order in which a respective one of the computers is to attempt to boot from boot devices (e.g., boot LUNs 306) hosted on storage 206 and 216 ("the storage devices") specified in the boot order. An administrator of fabric interconnect 212 may create the boot policies by populating service profiles using input/output devices and Graphical User Interfaces (GUIs) of the fabric interconnect. Alternatively, the boot profiles may be provided in files that are uploaded to fabric interconnect 212.

At 610, fabric interconnect 212 downloads to each of the computers a respective one of the boot policies (including boot order) that specifies an order in which the serer is to attempt to boot from boot devices specified in the boot order.

At 615, fabric interconnect 212 automatically determines network paths over which each of the computers is to access the boot devices in the boot order for that computer.

At 620, fabric interconnect 212 automatically determines an availability of each network path. To do this, fabric interconnect 212 detects network component failures in the network path, declares that the network path is unavailable if any detected network failure prevents the computer from accessing the boot device over the network path, and declares that the network path is available if there is no detected network failure that prevents the computer from accessing the boot device over the network path.

At 625, fabric interconnect 212 automatically determines an availability of endpoints of each network path. The endpoints include the computers, boot devices, and the storage on which the boot devices are hosted. To do this, for example, fabric interconnect detects whether a given boot device has failed, detects whether the boot device is powered-on or powered-off, declares that the boot device is not available if the boot device has failed or is powered-off, and declares that the boot device is available if the boot device has not failed and is powered-on.

At 630, fabric interconnect 212 automatically receives/collects boot status from each of the computers while the computer attempts to boot from boot devices in the boot order for that computer and stores the collected information in the boot data database of data 440. In addition, operation 630 stores the determined availabilities from 620-625 in the boot data database.

Operations 615-630 automatically collect information that gives insight into boot processes in the computers and factors external to the computers that may have a negative impact on those boot processes. Such external factors may include, for example:

a. Current unavailability of one or more boot devices (and/or the storage on which the boot devices are hosted). Causes may include incomplete boot device configurations (e.g., FC zoning or LUN masking may have incomplete or incorrect configurations), or hardware and software failures in the boot devices (or in the storage on which the boot devices are hosted);
b. Unavailability of one or more network/storage area network (SAN) paths; and
c. Traffic congestion on one or more network paths rendering computer access to the boot devices difficult.

At 635, fabric interconnect 212 automatically performs boot-related corrective actions based on the determined network path and boot device availabilities, and the received boot status. To do this, fabric interconnect 212 automatically analyzes the information collected in operations 615-630 (stored in the boot data database) and makes informed decisions to implement corrective actions.

Automatic boot-related actions performed at 635 may improve the reliability of a boot from network-attached boot devices (e.g., through interfaces such as iSCSI, FC, and FCoE) under certain conditions. Consider a case where a computer (e.g., computer 204(1)) and its assigned boot device (e.g., boot LUN 306(1) hosted in storage 206(1)) are powered by the same power source or power circuit. When the power source is powered-off or fails, both the computer and the boot device lose power. When power is restored, the boot device needs to boot itself before the computer can boot from the boot device. Using conventional techniques, if the computer attempts to boot before the boot device is powered-on and booted, the computer boot will fail, and the computer may require a manual recovery operation to reboot the computer when the boot device becomes available. Embodiments presented herein provide automatic recovery and thus avoid such manual recovery. More specifically, fabric interconnect 212 tracks the operational status and thus availability of the boot device and dynamically and automatically controls the order and timing of the boot sequence implemented at the computer accordingly. Additionally, fabric interconnect 212 may automatically apply a corrective action. For example, fabric interconnect 212 may determine that the boot device is not ready to serve input/output functions, e.g., because the boot device still being configured or is powered-off. When the boot device is ready to serve the input/output functions, fabric interconnect 212 may automatically power cycle the computer to restart the boot sequence therein.

As mentioned above, fabric interconnect 212 monitors the availability of the boot devices and the storage that hosts the boot devices (e.g., storage 206 and 216). When the boot devices become unavailable for an extended predetermined period of time (e.g., 10 minutes), fabric interconnect 212 identifies a list of all computers (e.g., computers 204, 208, and 210) that use the storage devices. With this information, fabric interconnect 212 may take any number of automatic corrective actions, including, but not limited to:

a. Powering-off computers to save power while their boot devices are unavailable. Without this mechanism in place, the computer may crash and continue to consume power until an administrator determines the computers have crashed;
b. Powering-on/Rebooting the computers when the boot devices are available again. The powering-on/rebooting may take advantage of:
    i. A boot policy that also indicates how many computers should be booted at any given time (because not all computers may be required to be operational at the given time); and
    ii. A boot policy that implements boot staggering to reduce a power surge;
c. Rebooting the computers to boot from different storage devices (possibly by creating new boot policies).

Several of the above-mentioned automatic boot-related actions performed at 635 are described in summary form below in connection with FIGS. 7, 8, 9, 13, and 14.

Figure 7:
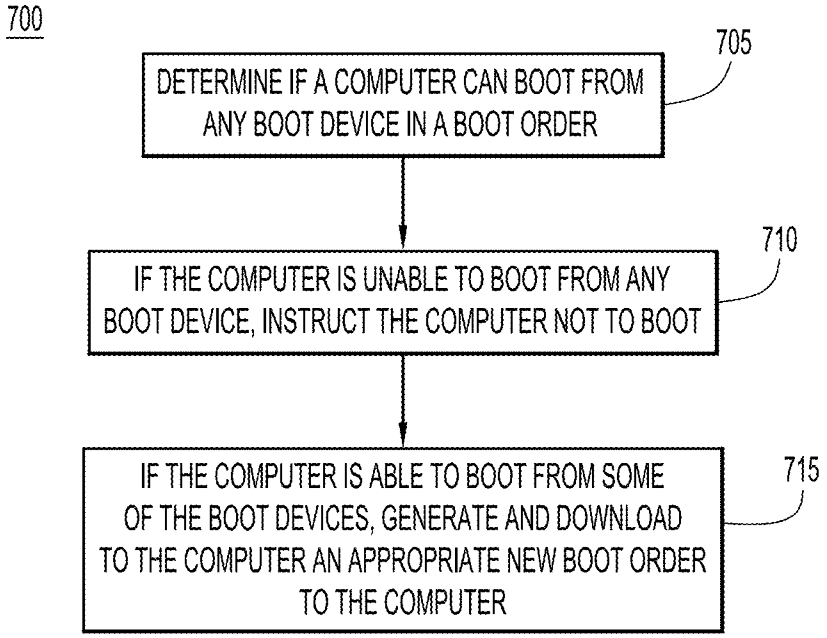
FIG. 7 is a flowchart of an automatic boot-related action performed in the method of FIG. 6, according to an example embodiment.

With reference to FIG. 7, there is a flowchart of an example automatic boot-related action 700 performed at 635.

At 705, fabric interconnect 212 determines whether a computer is able to boot from any boot device in the boot order for that computer, based on (i) the determined availabilities of the boot devices in the boot order, (ii) the determined availabilities of the network paths over which the computer accesses the boot devices in the boot order, and optionally (iii) the received boot status.

At 710, if it is determined that the computer is unable to boot from any boot device in the boot order, fabric interconnect 212 instructs the computer not to boot.

At 715, if it is determined that the computer is unable to boot from some boot devices but able to boot from other boot devices in the boot order for the computer, fabric interconnect 212 generates a new boot order for that computer that specifies only the other boot devices, and downloads the new boot order to the computer.

Operations 705-715 are repeated for each computer under control of/connected to fabric interconnect 212.

Figure 8:
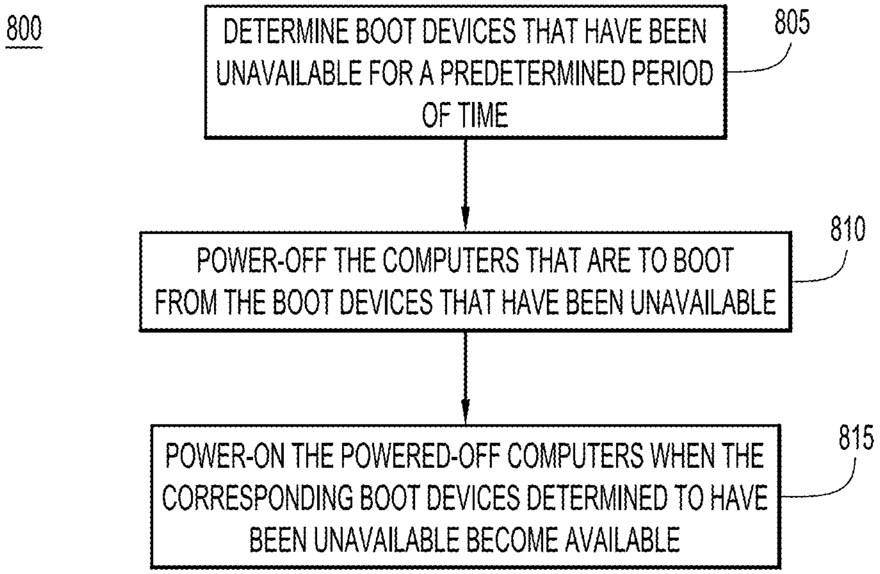
FIG. 8 is a flowchart of another automatic boot-related action performed in the method of FIG. 6, according to an example embodiment.

With reference to FIG. 8, there is a flowchart of another example automatic boot-related action 800 performed at 635. To assist with boot related action 800, fabric interconnect 212 may control power distribution to, and monitor the power states of, various appropriate computers and storage (boot devices) using a power control and monitor embodiment described below in connection with FIG. 15.

At 805, fabric interconnect 212 determines boot devices that have been unavailable for a predetermined period of time (e.g., 10 minutes) based on the determined boot device availabilities.

At 810, fabric interconnect 212 powers-off the computers that are to boot from the boot devices determined to have been unavailable for the predetermined period of time.

At 815, fabric interconnect 212 powers-on the powered-off computers when the corresponding boot devices determined to have been unavailable for the predetermined period of time become available.

Operations 805-815 are repeated for each computer under control of/connected to fabric interconnect 212.

Figure 9:
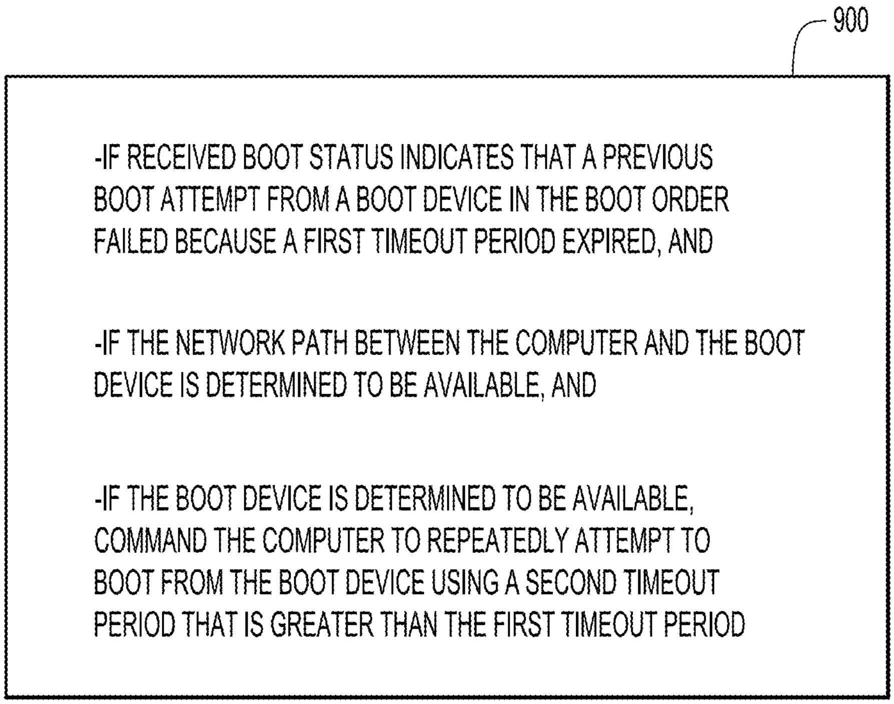
FIG. 9 is a flowchart of yet another automatic boot-related action performed in the method of FIG. 6, according to an example embodiment.

With reference to FIG. 9, there is a flowchart of yet another example automatic boot-related action 900 performed at 635. At 900, if the received boot status from a computer indicates that a previous boot attempt from a boot device in the boot order failed because a first timeout period expired (e.g., 60 seconds), and if the network path between the computer and the (previous) boot device is determined to be available, and if the determined availability of the (previous) boot device indicates that the boot device is available, fabric interconnect 212 commands the computer to repeatedly attempt to boot from the (previous) boot device using a second timeout period (e.g., 90 seconds) that is greater than the first timeout period.

With reference to FIG. 10, there is an illustration of an example boot policy 1000 for a given computer that is created/stored in fabric interconnect 212 and downloaded to one or more of the computers. Boot profile 1000 includes a list 1005 of boot device identifiers and a boot order 1010 to specify an order or sequence in which the computer is to attempt to boot from the listed boot devices. When stored in fabric interconnect 212, boot profile 1000 may also include a third column that lists determined availabilities mapped to corresponding/appropriate ones of the listed boot devices in the middle column of the profile.

Further processes/methods performed in computers 204, 208, and 210 and fabric interconnect 212 that relate to methods 600-900 are described below in connection with FIGS. 11-14.

Figure 11:
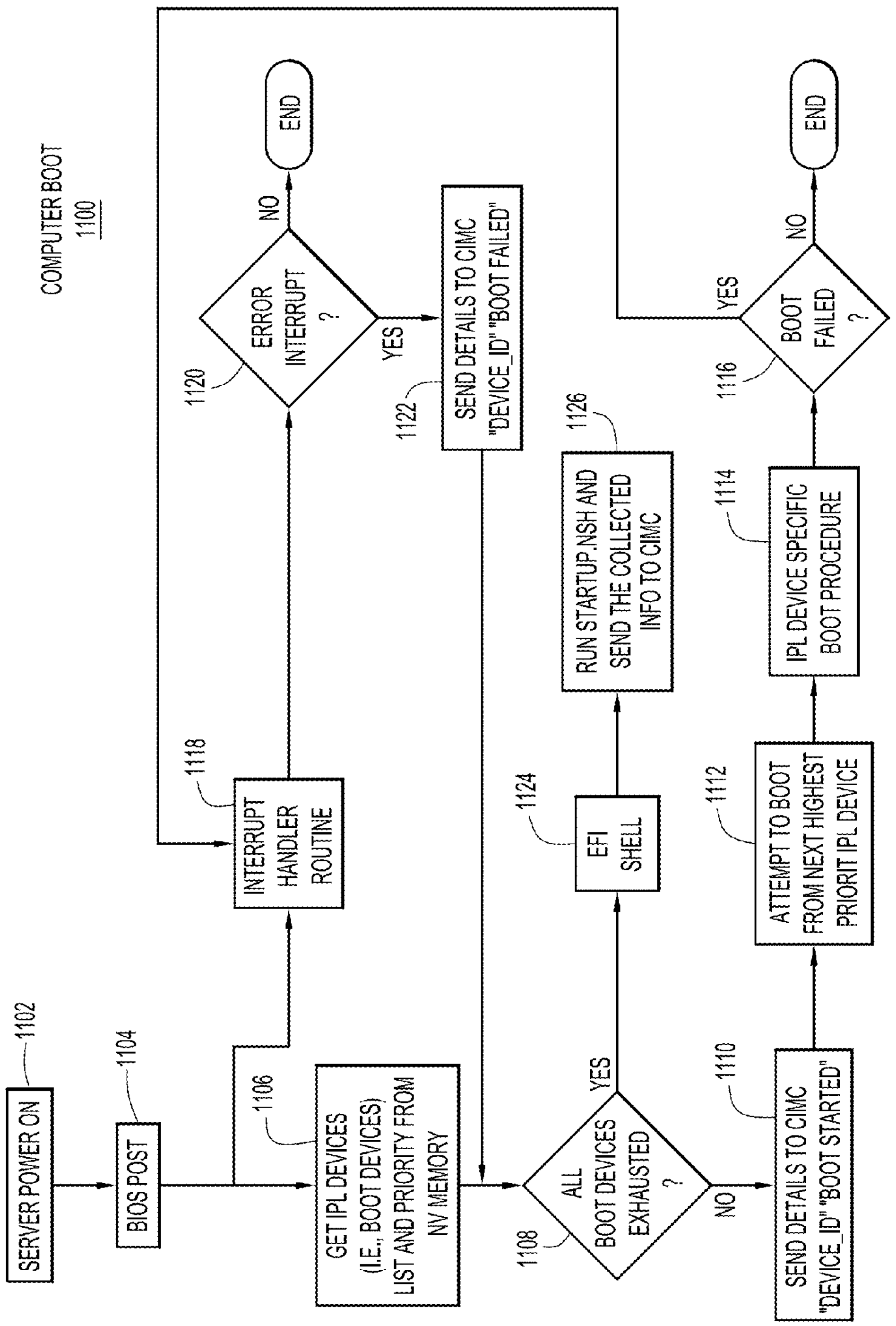
FIG. 11 is a flowchart of an example boot process performed in the computer in accordance with a boot policy, according to an example embodiment.

With reference to FIG. 11, there is a flowchart of an example boot process 1100 performed in a computer (e.g., in one of computers 204, 208, and 210) in accordance with a boot policy.

At 1102 and 1104, the computer powers-on and attempts to perform POST.

If POST passed, at 1106 the computer retrieves the boot profile (i.e., list of boot/IPL devices and the boot order) that was downloaded to the computer and stored in non-volatile memory (NVM) of the computer.

If the computer has not attempted to boot from all of the boot devices in the boot order, flow proceeds from 1108 to 1110-1116 where the computer attempts to boot from the next boot device listed in the boot order.

At 1110, the device identifier (referred to as "device id") of the next boot device from which the computer is to attempt to boot and a "boot started" indicator is communicated to CIMC 520, which forwards the boot device identifier to fabric interconnect 212 in a boot status message.

At 1112 and 1114, the computer attempts to retrieve the IPL in the identified boot device and, if retrievable, boot from the retrieved IPL.

At 1114, if the boot attempt is a success, the method ends. If the boot attempt fails, flow proceeds to 1118.

At 1118 and 1120, an interrupt handler routine is invoked and, if the interrupt was an error interrupt (boot was unsuccessful), flow proceeds to 1122.

At 1122, the identifier of the boot device and a "boot failed" indicator is communicated to CIMC 520, which forwards the boot device identifier and the boot failed message to fabric interconnect 212 in a boot status message. Flow proceeds to 1108.

Returning to 1108, if all of the boot devices have been exhausted (i.e., the computer has attempted to boot from all of the boot devices in the boot order without success), flow proceeds to 1124 and 1126.

At 1124, the EFI program 526 (also referred to as an "EFI shell" 526) is executed. EFI shell 526 collects information from the computer and sends the collected information to CIMC 520, which forwards the information to fabric interconnect 212 in a boot status message.

Figure 12:
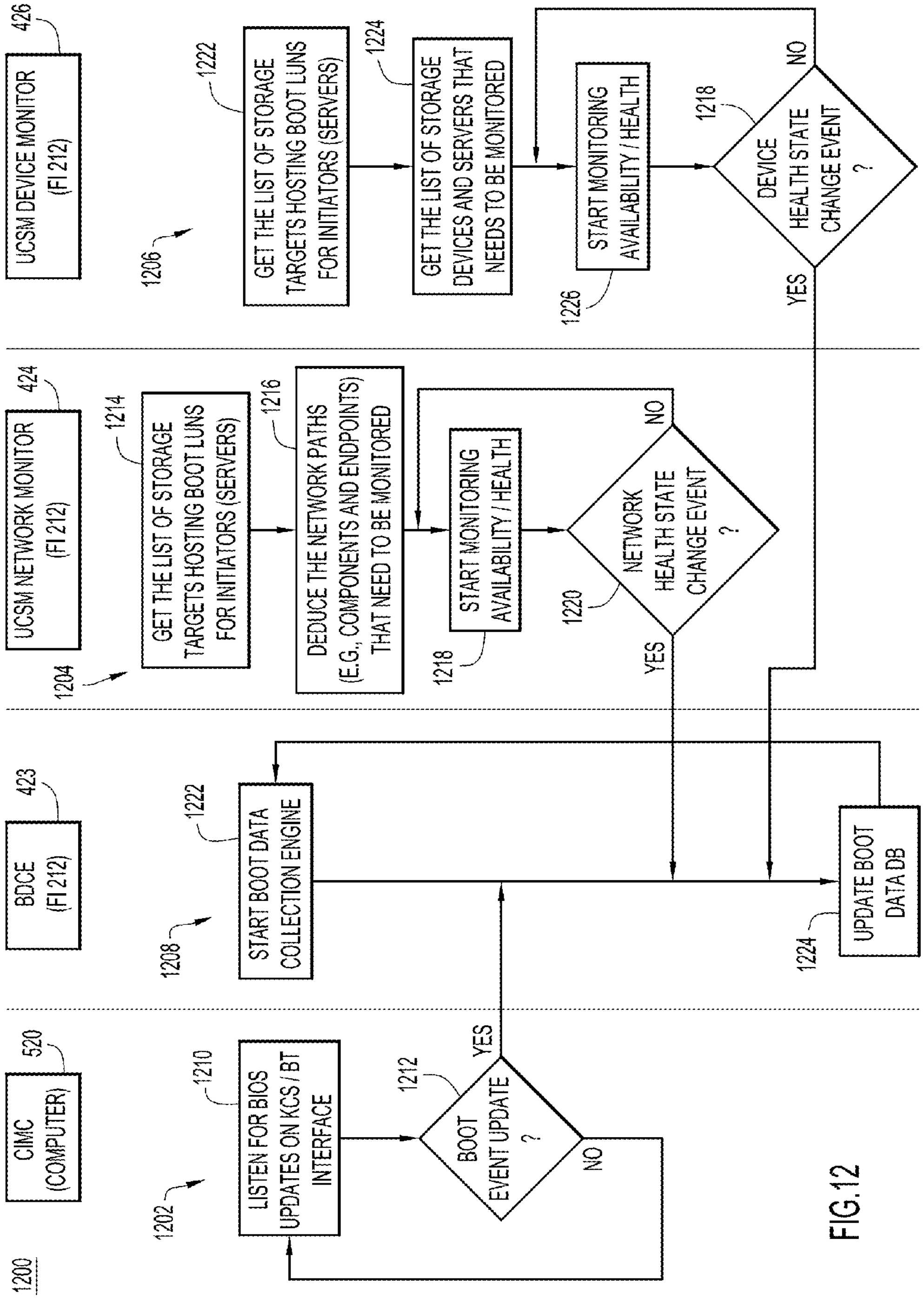
FIG. 12 is a flowchart of various processes performed in the computer and the fabric interconnect to monitor boot success of the computer, according to an example embodiment.

With reference to FIG. 12, there is a flowchart of various interacting processes 1200 performed in a computer (e.g., one of computers 204, 208, and 210) and in fabric interconnect 212 to monitor boot success in the computer. Processes 1200 include:

a. A process 1202 performed by CIMC 520 in the computer to collect boot status from the computer and report the status to fabric interconnect 212;
b. A process 1204 performed by UCSM Network Monitor 424 in the fabric interconnect (FI) to monitor network path availability. Process 1204 represents an embodiment of operations 615 and 620 of method 600;
c. A process 1206 performed by UCSM Device Monitor 426 in the fabric interconnect to monitor endpoint device availabilities (e.g., availabilities of computers, boot devices, and storage that hosts the boot devices). Process 1206 represents an embodiment of operation 625 in method 600; and
d. A process 1208 performed by BDCE 423 in the fabric interconnect to collect/receive boot-related status from processes 1202, 1204, and 1206. Process 1208 represents an embodiment of operation 630 in method 600.

Referring first to process 1202, at 1210 and 1212, CIMC 520 collects boot status from the computer and reports the boot status to process 1208 in a boot status message.

Referring to process 1204, at 1214 and 1216, UCSM Network Monitor 424 accesses lists of boot devices and storage (referred to in FIG. 12 as "storage targets" that host boot LUNs) for the computers (referred to in FIG. 12 as "initiators") based on the boot policies for the computers. Monitor 424 determines network paths, including network components therein, that connect the listed computers to appropriate ones of the listed boot devices. At 1218 and 1220, Monitor 424 determines the health/availability of the determined network paths, including the health/availability of components of the network paths, and reports the determined health/availability to process 1208.

Referring to process 1206, operations 1222-1218 are similar to operations 1214-1220 described above, except that in operations 1222-1218, UCSM Device Monitor 426 determines and reports the health/availability of the endpoints of the network paths determined in process 1206. The endpoints include the computers, the boot devices, and the storage on which the boot devices are hosted, and software processes executing on the endpoints.

Referring to process 1208, at 1222 and 1224, BDCE 423 collects/receive boot status messages and health/availability reports as depicted in FIG. 12, and stores the information in the boot data database (in data 440, FIG. 4).

Figure 13:
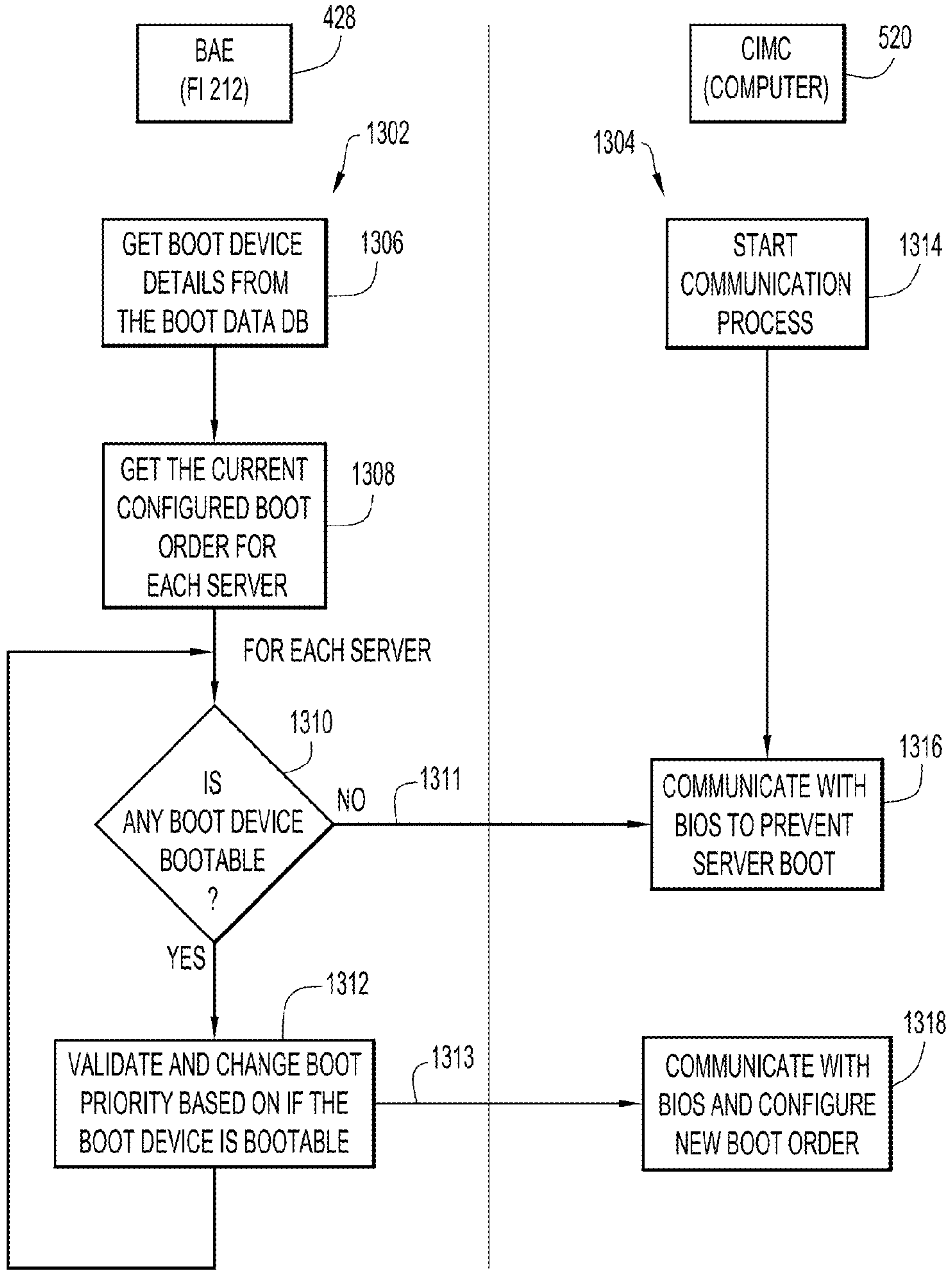
FIG. 13 is a flowchart of an example process performed by the fabric interconnect, and an example process performed by the computer, to control a boot process of the computer, according to an example embodiment.

With reference to FIG. 13, there is a flowchart of an example process 1302 performed by BAE 428 in fabric interconnect 212, and an example process 1304 performed by CIMC 520 in a computer (e.g., one of computers 204, 208, and 210) that interacts with the process 1302. Together, processes 1302 and 1304 control a boot process in the computer.

Referring first to process 1302, at 1306 and 1308, BAE 428 accesses boot device information (e.g., availabilities and boot status) stored in the boot device database and boot orders for each of the computers (e.g., each of computers 204, 208, and 210). At 1310, if it is determined that none of the boot devices listed in a boot order for a given computer is bootable (i.e., available), BAE 428 sends a message 1311 to CIMC 520 instructing the computer not to boot. Otherwise flow proceeds to 1312. At 1312, if only some of the boot devices listed in the boot order for the given computer are bootable, BAE 428 creates a new boot order 1313 using only the available boot devices and sends the new boot order to CIMC 520 in the computer. Operations 1310 and 1312 are repeated for each computer connected with fabric interconnect 212. Operation 1312 represents an embodiment of operation 635 in method 600.

Referring to process 1304, at 1314, communication processes in the computer are initiated. At 1316, CIMC 520 communicates with the BIOS to prevent the computer from booting responsive to message 1311. At 1318, CIMC 520 communicates the new boot order 1313 to the BIOS.

Figure 14:
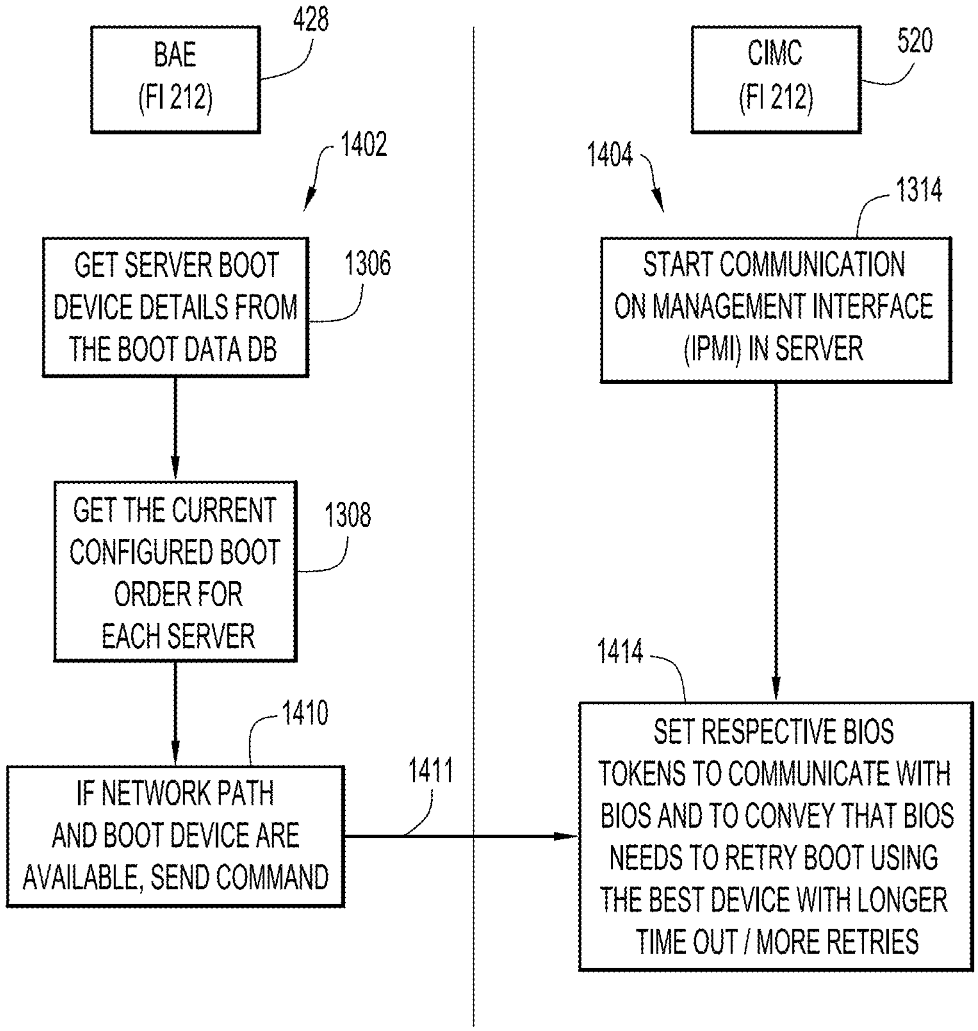
FIG. 14 is a flowchart of another example process performed by the fabric interconnect, and another example process performed by the computer, to control a boot process of the computer, according to an example embodiment.

With reference to FIG. 14, there is a flowchart of an example process 1402 performed by BAE 428 in fabric interconnect 212, and an example process 1404 performed by CIMC 520 in a computer (e.g., one of computers 204, 208, and 210) that interacts with the process 1402. Together, processes 1402 and 1404 control a boot process in the computer.

Referring first to process 1402, the process begins with operations 1306 and 1308 similar to process 1302 describe above in connection with FIG. 13. At 1410, if (i) the network path between a given computer and a boot device from which the computer has attempted unsuccessfully to boot is determined to be available, and (ii) the boot device is determined to be available, BAE 428 sends a message 1411 to CIMC 520 in the computer to have the CIMC set respective BIOS tokens that will cause the BIOS to attempt to boot repeatedly from the boot device with a longer boot timeout period than was used in a previous boot attempt. Message 1411 may include a new number N of retries and the longer timeout period. Operation 1410 represents an embodiment of operation 635 in method 600.

Referring to process 1404, the process begins with operations 1314 similar to process 1304 describe above in connection with FIG. 13. At 1414, CIMC 520 receives message 1411 from operation 1410 and sets the respective BIOS tokens so that BIOS 526 will attempt to boot repeatedly from the boot device and will use the longer boot timeout period. Additionally, if message 1411 includes the number N of retries and the longer timeout period, CIMC 520 stores that information in non-volatile memory (data 540) for access by BIOS 526. Alternatively, the number N of retries and the longer timeout period may be pre-provisioned in the non-volatile memory (along with the original, shorter timeout period). Responsive to the tokens, BIOS 526 access the number N of retries and the longer timeout period stored in non-volatile memory and uses them as control attributes during boot as described above in connection with FIG. 5.

The ability of fabric interconnect 212 and BIOS 526 to control the boot timeout period/number N of retry attempts operates as a feedback loop to ensure computer (e.g., computer 206(1)) will boot reliably from the given boot device. The use of BIOS tokens is a convenient mechanism to implement the feedback. When the tokens are disabled, BIOS 526 operates normally, i.e., using the shorter predetermined timeout period and without repeatedly attempting to boot from the same boot device. If the tokens are enabled, BIOS 526 uses the longer timeout period and repeated boot attempts. Multiple tokens may be used in message 1411 to selectively enable the use of either the longer timeout period or the repeated reboots, or both, under control of fabric connector 212.

Figure 15:
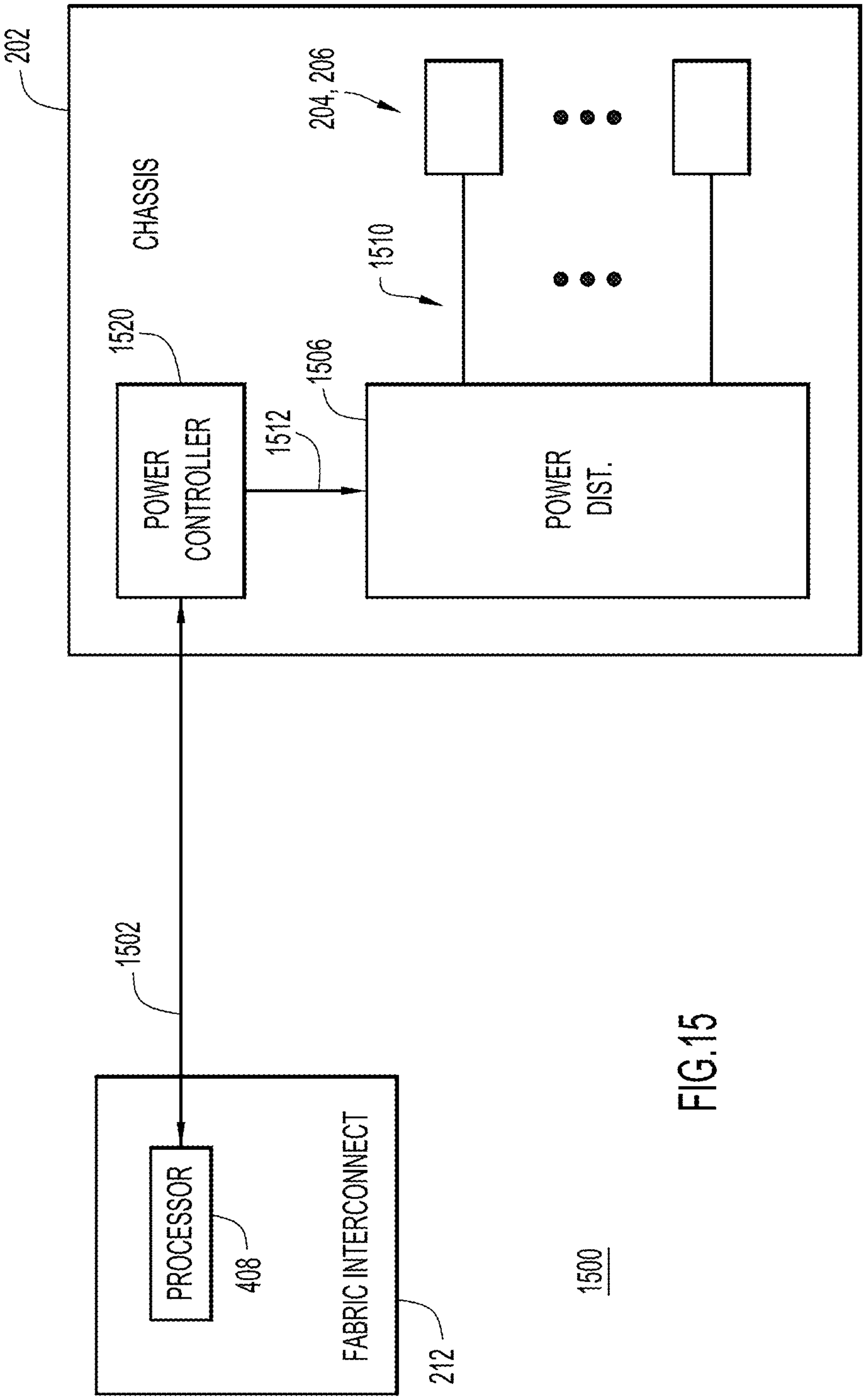
FIG. 15 is a block diagram of an example power monitor and control system used to monitor and control power used by various computers and storage devices in the UCS of FIG. 2, according to an example embodiment.

With reference to FIG. 15, there is a block diagram of an example power monitor and control system 1500 used to monitor and control power used by various computers and storage depicted in FIG. 2. Power monitor and control system 1500 includes processor 408 of fabric interconnect 212 connected to components in chassis 202 (described below) over a communication link 1502. Chassis 202 includes a power distribution (Power Dist.) subsystem 1506 to generate power and selectively supply the power to computers 204 and storage 206 over respective ones of power lines 1510 responsive to control signals 1512. Chassis 202 also includes a power controller (PWR CNTRLR) 1520 that generates control signals 1512 responsive to commands received from processor 408 of fabric interconnect 212 over communication link 1502, and provides the control signals to power distribution subsystem 1506. Power controller 1520 also monitors power-on, power-off, and power failure status of power distribution subsystem 1506 and each of computers 204 (server blades) and each of storage 206 (storage blades), and reports the monitored status to processor 408 of fabric interconnect 212 over communication link 1502. In this way, processor 408 may selectively and dynamically control which of computers 204 and storage 206 are powered-on and powered-off at any given time, and collect power status for the computers and storage. Processor 408 controls the power and uses the power status in various embodiments as described above.

In summary, embodiments presented herein include a method and an apparatus for dynamic control and monitoring of each of many computer boot sequences, where each computer may include an Intel x86 series processor. Embodiments monitor a boot sequence in each computer each time the computer boots; reports which boot device the computer is booting from; identifies and reports alarms when the computer does not boot from the expected boot device; provide a policy-based mechanism to reliably boot from a specified boot device, even when the target boot device is unavailable; and take corrective actions based on boot policy. Corrective actions may save power while storage devices are unavailable and restore computer availability when the storage devices become available. Embodiments presented herein automatically determines which actual boot device a computer boots from each time the computer boots, performs boot failure analysis, minimizes power consumption when storage devices are unavailable, automatically boots computers when boot devices are powered-on.

In summary, in one form, a method is provided comprising: at a network device to manage multiple computers and connect the computers to boot devices that store boot programs used by the computers to boot: downloading to each computer a respective boot order that specifies an order in which the computer is to attempt to boot from boot devices specified in the boot order; automatically determining network paths over which each computer is to access the boot devices in the boot order for that computer; automatically determining an availability of each network path; automatically determining an availability of each boot device; automatically receiving boot status from each computer while the computer attempts to boot from boot devices in the boot order for that computer; and automatically performing boot-related actions based on the determined network path and boot device availabilities, and the received boot status.

In summary, in another form, an apparatus is provided comprising: network ports coupled to a communication network and configured to connect multiple computers to boot devices that store boot programs used by the computers to boot; a processor coupled to the network ports to manage the multiple computers and to: download to each computer a respective boot order that specifies an order in which the computer is to attempt to boot from boot devices specified in the boot order; automatically determine network paths over which each computer is to access the boot devices in the boot order for that computer; automatically determine an availability of each network path; automatically determine an availability of each boot device; automatically receive boot status from each computer while the computer attempts to boot from boot devices in the boot order for that computer; and automatically perform boot-related actions based on the determined network path and boot device availabilities, and the received boot status.

In summary, in yet another form, a processor readable medium is provided. The computer readable storage media is encoded with instructions that, when executed by a processor of a network device to manage multiple computers and connect the computers to boot devices that store boot programs used by the computers to boot, cause the processor to: download to each computer a respective boot order that specifies an order in which the computer is to attempt to boot from boot devices specified in the boot order; automatically determine network paths over which each computer is to access the boot devices in the boot order for that computer; automatically determine an availability of each network path; automatically determine an availability of each boot device; automatically receive boot status from each computer while the computer attempts to boot from boot devices in the boot order for that computer; and automatically perform boot-related actions based on the determined network path and boot device availabilities, and the received boot status.

The above description is intended by way of example only.

What is claimed is:

1. A method comprising:

at a network device to manage multiple computers and connect the computers to boot devices that store boot programs used by the computers to boot:

downloading to each computer a respective boot order that specifies an order in which the computer is to attempt to boot from boot devices specified in the boot order;

automatically determining network paths over which each computer is to access the boot devices in the boot order for that computer;

automatically determining an availability of each network path;

automatically determining an availability of each boot device;

automatically receiving boot status from each computer while the computer attempts to boot from boot devices in the boot order for that computer; and automatically performing boot-related actions based on the determined network path and boot device availabilities, and the received boot status, wherein automatically performing boot-related actions includes, for each computer:

determining whether the computer is able to boot from any of the boot devices in the boot order for the computer based on the determined availabilities of the boot devices in the boot order, the determined availability of the network paths over which the computer accesses the boot devices in the boot order, and the received boot status;

if it is determined that the computer is unable to boot from some boot devices but able to boot from other boot devices in the boot order for the computer:

generating a new boot order for the computer that specifies only the other boot devices, from which the computer is able to boot; and downloading the new boot order to the computer; and if it is determined that the computer is unable to boot from any of the boot devices in the boot order, instructing the computer not to boot; and automatically collecting: an extensible firmware interface mapping between user-defined boot device names and device handles; a list of devices managed by extensible firmware interface drivers; available drivers; driver diagnostics; a content of blocks that are supposed to contain a master boot record for all block devices; and values of peripheral component interface (PCI) registers for all devices, including a PCI command register, a PCI status register, and Advance Error Reporting registers.

2. The method of claim 1, wherein the automatically determining an availability of each network path comprises:

detecting network component failures in the network path;

declaring that the network path is unavailable if any detected network failure prevents the computer from accessing the boot device over the network path; and declaring that the network path is available if there is no detected network failure that prevents the computer from accessing the boot device over the network path.

3. The method of claim 1, wherein the automatically determining an availability of each boot device comprises:

detecting whether the boot device has failed;

detecting whether the boot device is powered-on or powered-off;

declaring that the boot device is not available if the boot device has failed or is powered-off; and declaring that the boot device is available if the boot device has not failed and is powered-on.

4. The method of claim 1, wherein the instructing includes sending commands to the computer that are to be interpreted by a Basic Input/Output System (BIOS) of the computer that controls the boot sequence of the computer.

5. The method of claim 1, wherein the automatically performing boot-related actions includes:

determining boot devices that have been unavailable for a predetermined period of time based on the determined boot device availabilities;

powering-off the computers that are to boot from the boot devices determined to have been unavailable for the predetermined period of time; and powering-on the powered-off computers when the corresponding boot devices determined to have been unavailable for the predetermined period of time become available.

6. The method of claim 1, wherein the automatically performing boot-related actions on the computers includes, for each computer:

if the received boot status indicates that a previous boot attempt from a boot device in the boot order failed because a first timeout period expired, and if the network path between the computer and the boot device is determined to be available, and if the determining an availability of boot device indicates that the boot device is available, commanding the computer to repeatedly attempt to boot from the boot device using a second timeout period that is greater than the first timeout period.

7. The method of claim 1, wherein the receiving boot status from each computer includes receiving:

an indication of whether the computer failed or passed power-on-self-test (POST);

an indicator of any failed boot attempt and an identifier of the boot device on which the attempt failed; and values of status registers in the computer, including command and communication registers.

8. An apparatus comprising:

network ports coupled to a communication network and configured to connect multiple computers to boot devices that store boot programs used by the computers to boot; and a processor coupled to the network ports configured to manage the multiple computers and to:

download to each computer a respective boot order that specifies an order in which the computer is to attempt to boot from boot devices specified in the boot order;

automatically determine network paths over which each computer is to access the boot devices in the boot order for that computer;

automatically determine an availability of each network path;

automatically determine an availability of each boot device;

automatically receive boot status from each computer while the computer attempts to boot from boot devices in the boot order for that computer; and automatically perform boot-related actions based on the determined network path and boot device availabilities, and the received boot status, by, for each computer:

determining whether the computer is able to boot from any of the boot devices in the boot order for the computer based on the determined availabilities of the boot devices in the boot order, the determined availability of the network paths over which the computer accesses the boot devices in the boot order, and the received boot status;

if it is determined that the computer is unable to boot from some boot devices but able to boot from other boot devices in the boot order for the computer:

generating a new boot order for the computer that specifies only the other boot devices, from which the computer is able to boot; and downloading the new boot order to the computer; and if it is determined that the computer is unable to boot from any of the boot devices in the boot order, instructing the computer not to boot; and automatically collecting: an extensible firmware interface mapping between user-defined boot device names and device handles; a list of devices managed by extensible firmware interface drivers; available drivers; driver diagnostics; a content of blocks that are supposed to contain a master boot record for all block devices; and values of peripheral component interface (PCI) registers for all devices, including a PCI command register, a PCI status register, and Advance Error Reporting registers.

9. The apparatus of claim 8, wherein the processor automatically determines an availability of each network path by:

detecting network component failures in the network path;

declaring that the network path is unavailable if any detected network failure prevents the computer from accessing the boot device over the network path; and declaring that the network path is available if there is no detected network failure that prevents the computer from accessing the boot device over the network path.

10. The apparatus of claim 8, wherein the processor automatically determines an availability of each boot device by:

detecting whether the boot device has failed;

detecting whether the boot device is powered-on or powered-off;

declaring that the boot device is not available if the boot device has failed or is powered-off; and declaring that the boot device is available if the boot device has not failed and is powered-on.

11. The apparatus of claim 8, wherein the processor automatically performs further boot-related actions by:

determining boot devices that have been unavailable for a predetermined period of time based on the determined boot device availabilities;

powering-off the computers that are to boot from the boot devices determined to have been unavailable for the predetermined period of time; and powering-on the powered-off computers when the corresponding boot devices determined to have been unavailable for the predetermined period of time become available.

12. The apparatus of claim 8, wherein the processor automatically performs further boot-related actions on the computers by, for each computer:

if the received boot status indicates that a previous boot attempt from a boot device in the boot order failed because a first timeout period expired, and if the network path between the computer and the boot device is determined to be available, and if the determining an availability of boot device indicates that the boot device is available, commanding the computer to repeatedly attempt to boot from the boot device using a second timeout period that is greater than the first timeout period.

13. The apparatus of claim 8, wherein the processor receives boot status from each computer by receiving:

an indication of whether the computer failed or passed power-on-self-test (POST);

an indicator of any failed boot attempt and an identifier of the boot device on which the attempt failed; and values of status registers in the computer, including command and communication registers.

14. A non-transitory computer readable storage media encoded with instructions that, when executed by a processor of a network device to manage multiple computers and connect the computers to boot devices that store boot programs used by the computers to boot, cause the processor to:

download to each computer a respective boot order that specifies an order in which the computer is to attempt to boot from boot devices specified in the boot order;

automatically determine network paths over which each computer is to access the boot devices in the boot order for that computer;

automatically determine an availability of each network path;

automatically determine an availability of each boot device;

automatically receive boot status from each computer while the computer attempts to boot from boot devices in the boot order for that computer; and automatically perform boot-related actions based on the determined network path and boot device availabilities, and the received boot status, by, for each computer:

determining whether the computer is able to boot from any of the boot devices in the boot order for the computer based on the determined availabilities of the boot devices in the boot order, the determined availability of the network paths over which the computer accesses the boot devices in the boot order, and the received boot status;

if it is determined that the computer is unable to boot from some boot devices but able to boot from other boot devices in the boot order for the computer:

generating a new boot order for the computer that specifies only the other boot devices, from which the computer is able to boot; and downloading the new boot order to the computer; and if it is determined that the computer is unable to boot from any of the boot devices in the boot order, instructing the computer not to boot; and automatically collecting: an extensible firmware interface mapping between user-defined boot device names and device handles; a list of devices managed by extensible firmware interface drivers; available drivers; driver diagnostics; a content of blocks that are supposed to contain a master boot record for all block devices; and values of peripheral component interface (PCI) registers for all devices, including a PCI command register, a PCI status register, and Advance Error Reporting registers.

15. The non-transitory computer readable storage media of claim 14, wherein the instructions to cause the processor to automatically determine an availability of each network path include instructions to cause the processor to:

detect network component failures in the network path;

declare that the network path is unavailable if any detected network failure prevents the computer from accessing the boot device over the network path; and declare that the network path is available if there is no detected network failure that prevents the computer from accessing the boot device over the network path.

16. The non-transitory computer readable storage media of claim 14, wherein the instructions to cause the processor to automatically determine an availability of each boot device include instructions to cause the processor to:

detect whether the boot device has failed;

detect whether the boot device is powered-on or powered-off;

declare that the boot device is not available if the boot device has failed or is powered-off; and declare that the boot device is available if the boot device has not failed and is powered-on.

17. The non-transitory computer readable storage media of claim 14, wherein the instructions to cause the processor to automatically perform boot-related actions include instructions to cause the processor to:

determine boot devices that have been unavailable for a predetermined period of time based on the determined boot device availabilities;

power-off the computers that are to boot from the boot devices determined to have been unavailable for the predetermined period of time; and power-on the powered-off computers when the corresponding boot devices determined to have been unavailable for the predetermined period of time become available.

18. The non-transitory computer readable storage media of claim 14, wherein the instructions to cause the processor to automatically perform boot-related actions on the computers include instructions to cause the processor to, for each computer:

if the received boot status indicates that a previous boot attempt from a boot device in the boot order failed because a first timeout period expired, and if the network path between the computer and the boot device is determined to be available, and if the determining an availability of boot device indicates that the boot device is available, command the computer to repeatedly attempt to boot from the boot device using a second timeout period that is greater than the first timeout period.

19. The non-transitory computer readable storage media of claim 14, wherein the instructions to cause the processor to receive boot status from each computer include instructions to cause the processor to receive:

an indication of whether the computer failed or passed power-on-self-test (POST);

an indicator of any failed boot attempt and an identifier of the boot device on which the attempt failed; and values of status registers in the computer, including command and communication registers.

20. The method of claim 1, further comprising:

automatically collecting boot-related Basic Input/Output System (BIOS) error codes, including codes indicating that:

the BIOS is unable to reach an Internet Small Computer System Interface (iSCSI) target;

an iSCSI session started but was terminated; and an iSCSI session was initiated but there is no bootable logical unit number.

* * * * *